United States Patent
Arroyo et al.

(10) Patent No.: US 9,678,892 B2
(45) Date of Patent: *Jun. 13, 2017

(54) FLEXIBLE I/O DMA ADDRESS ALLOCATION IN VIRTUALIZED SYSTEMS

(71) Applicant: International Business Machines Corporation, Armonk, NY (US)

(72) Inventors: Jesse P. Arroyo, Rochester, MN (US); Rama K. Hazari, Hyderabad (IN); Sakethan R. Kotta, Hyderabad (IN); Kumaraswamy Sripathy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/841,826

(22) Filed: Sep. 1, 2015

(65) Prior Publication Data
US 2017/0060770 A1    Mar. 2, 2017

(51) Int. Cl.
*G06F 12/10* (2016.01)
*G06F 12/1081* (2016.01)
*G06F 13/28* (2006.01)
*G06F 12/1009* (2016.01)

(52) U.S. Cl.
CPC ...... *G06F 12/1081* (2013.01); *G06F 12/1009* (2013.01); *G06F 13/28* (2013.01); *G06F 2212/656* (2013.01); *G06F 2212/657* (2013.01)

(58) Field of Classification Search
CPC .. G06F 12/1081; G06F 12/1009; G06F 12/10; G06F 12/0292; G06F 12/1027; G06F 13/28; G06F 2212/657; G06F 2212/656; G06F 2212/65; G06F 2212/68; G06F 2212/681; G06F 2212/1016
See application file for complete search history.

(56) References Cited

U.S. PATENT DOCUMENTS

| | | | |
|---|---|---|---|
| 6,785,759 B1 * | 8/2004 | Beukema | G06F 12/0292 710/308 |
| 7,363,404 B2 | 4/2008 | Boyd et al. | |
| 7,660,912 B2 | 2/2010 | Gregg | |
| 8,284,768 B2 | 10/2012 | Roychoudhury et al. | |
| 2002/0116590 A1 * | 8/2002 | Franaszek | G06F 12/023 711/170 |
| 2008/0168208 A1 * | 7/2008 | Gregg | G06F 9/5077 710/306 |

(Continued)

OTHER PUBLICATIONS

Arroyo et al., "Flexible I/O DMA Address Allocation in Virtualized Systems", U.S. Appl. No. 14/868,629, filed Sep. 29, 2015.

(Continued)

*Primary Examiner* — Michael Krofcheck
(74) *Attorney, Agent, or Firm* — Laura E. Gisler

(57) ABSTRACT

An I/O DMA address may be translated for a flexible number of entries in a translation validation table (TVT) for a partitionable endpoint number, when a particular entry in the TVT is accessed based on the partitionable endpoint number. A presence of an extended mode bit can be detected in a particular TVT entry. Based on the presence of the extended mode bit, an entry in the extended TVT can be accessed and used to translate the I/O DMA address to a physical address.

11 Claims, 6 Drawing Sheets

TVT Entry (TVE) with Extended TVT Address Field

(56) References Cited

U.S. PATENT DOCUMENTS

| | | | |
|---|---|---|---|
| 2009/0276605 A1 | 11/2009 | Arndt et al. | |
| 2011/0320756 A1* | 12/2011 | Craddock | G06F 13/28 |
| | | | 711/202 |
| 2011/0320759 A1* | 12/2011 | Craddock | G06F 13/28 |
| | | | 711/206 |
| 2012/0036302 A1 | 2/2012 | Lais et al. | |
| 2014/0129797 A1 | 5/2014 | Arndt et al. | |

OTHER PUBLICATIONS

List of IBM Patents or Patent Applications Treated as Related, dated Sep. 25, 2015, pp. 1-2.

Hyun et al., "The Design of PCI Express for Future Communication Platform", Proceedings of 2004 International Symposium on Intelligent Signal Processing and Communication Systems, Nov. 2004. ISPACS 2004. pp. 734-739. doi: 10.1109/ISPACS.2004.1439156.

* cited by examiner

FLEXIBLE I/O DMA ADDRESS ALLOCATION IN VIRTUALIZED SYSTEMS

BACKGROUND

The present disclosure relates to address translation, and more specifically, to direct memory access (DMA) translation in virtualized systems.

Modern computing systems, for example server class computers, can utilize DMA translation mechanisms to enable input/output (I/O) virtualization. DMA translation can also allow for the sharing of a physical I/O device across multiple operating system (OS) images. This can allow for access to large real or physical memories using smaller address sizes. Systems may also use DMA translation mechanisms to protect some areas of system memory. For example, memory containing an OS kernel or hypervisor may be protected from unauthorized DMA.

Direct memory access in virtualized environments may require software or firmware to generate a table of translations between the address presented to a DMA controller and the actual target address in the system memory.

SUMMARY

Embodiments of the present disclosure can be directed toward a method for translating an I/O DMA address where a number of entries in a translation validation table (TVT) for a partitionable endpoint number (PE#) is flexible. Based on the PE#, a system can access a particular entry in the TVT. The PE# can be determined by a DMA requester ID (RID). Based on one or more bits in the particular entry in the TVT, an extended mode bit can be detected in the particular entry in the TVT. An entry in the extended TVT can be accessed, based on a value in the extended mode bit. Based on the value, and from bits in the I/O DMA address, the I/O DMA address can be translated to a physical address. The physical address may be the physical address that was requested by an I/O device associated with the I/O DMA address.

Embodiments of the present disclosure may be directed toward a system for translating an I/O DMA address where a number of entries in a TVT for a PE# is flexible. The system may have a processor circuit that has been configured to access a particular entry in the TVT. This entry may be based on the PE# and the PE# may be determined by a DMA RID. A presence of an extended mode bit may be detected in the particular entry in the TVT and an entry in the extended TVT may be accessed from an extended TVT and based on a value in the extended mode bit. The I/O DMA address may be translated to a physical address requested by an I/O device associated with the I/O DMA address based on a value from the entry in the extended TVT and from bits in the I/O DMA address.

Embodiments of the present disclosure may be directed toward a computer program product for translating an I/O DMA address, where a number of entries in a TVT for a PE# is flexible. The computer program product may have a computer readable storage medium with program instructions embodied within. The computer readable storage medium is not a transitory signal per se. The program instructions may be executable by a computer processing circuit to cause the circuit to perform a method. The method can include accessing a particular entry in the TVT. The entry can be accessed based on the PE# and the PE# can be determined by a DMA RID. A presence of an extended mode bit in the particular TVT entry can be detected and based on the extended mode bit, an entry in the extended TVT can be accessed. Based on the value from the entry in the extended TVT and from bits in the I/O DMA address, the I/O DMA address can be translated to a physical address. The physical address may be the address requested by an I/O device associated with the I/O DMA address.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
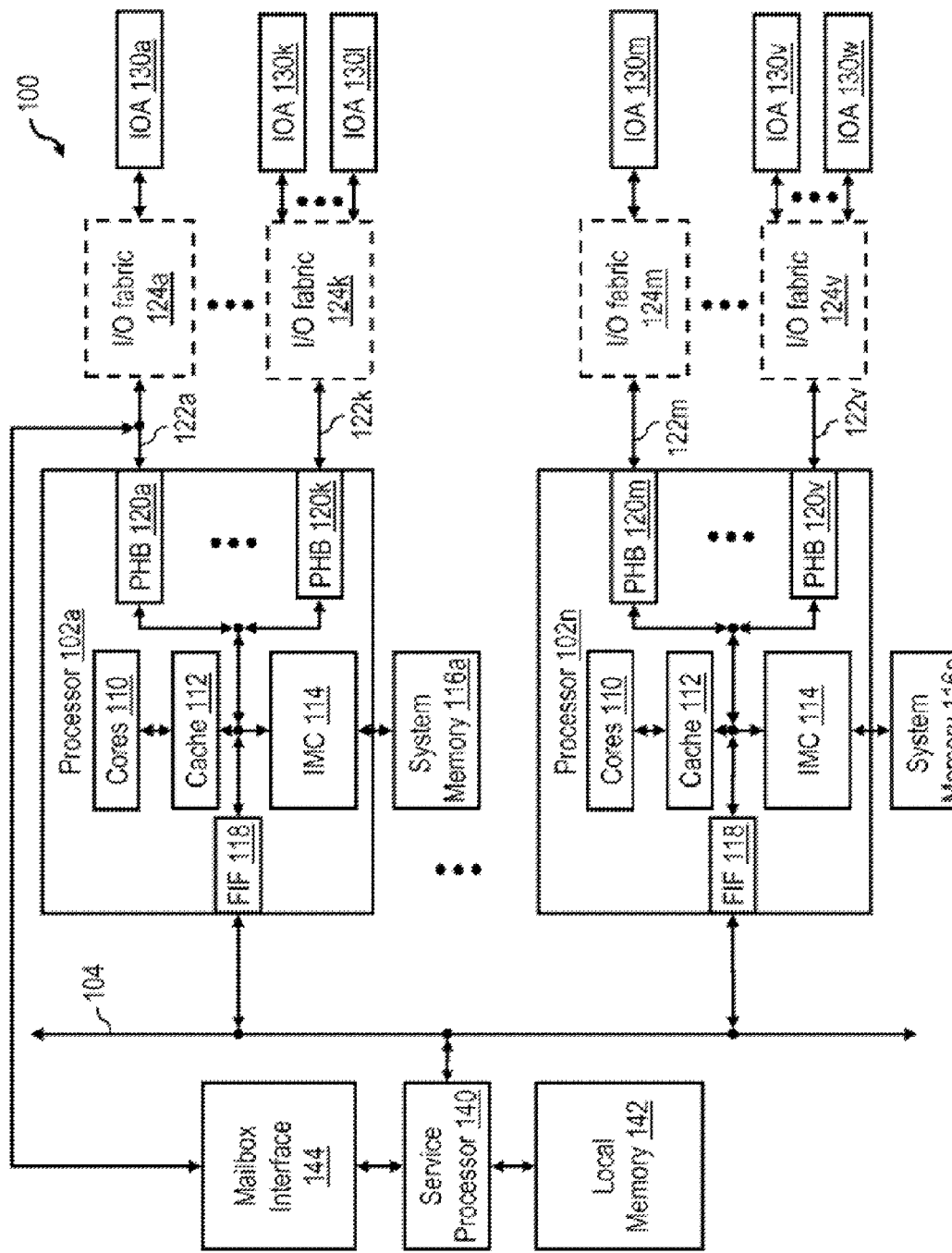
FIG. 1 depicts a high level block diagram of a data processing system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, more particular aspects relate to address translation in virtualized systems. While the present disclosure is not necessarily limited to such applications, various aspects of the disclosure may be appreciated through a discussion of various examples using this context.

DMA in computer systems can allow certain hardware associated with the system to access the main system memory independent of the central processing unit (CPU). DMA channels can allow for the transfer of data to and from devices with less CPU overhead than systems that do not use DMA channels. Many hardware devices including disk drive controllers, graphics cards, network cards, and sound cards use DMA. To carry out an input/output (I/O) DMA operation, a host processor can initialize the DMA controller. The system can then send commands to a peripheral device to initiate the data transfer. The DMA controller can then provide addresses and read/write control lines to the system memory. Each time a unit of data is ready to be transferred between the peripheral (I/O) device and memory, the DMA controller can increment its internal address register once the I/O DMA operation is completed.

DMA translation mechanisms may be used by modern computing systems. In some DMA translation mechanisms, each 4 KB page of physical system memory may be associated with a corresponding region (e.g. page) of I/O bus DMA address space. This may allow for address translations from an I/O bus DMA address space to physical system memory locations.

System hardware that is a target location of a DMA operation from an I/O device can use the incoming DMA page address on the I/O bus to retrieve, from a translation table, a translation from the DMA page address to the physical system memory page address. For example, a Peripheral Component Interconnect Express (PCIe) Host Bridge (PHB) may use an incoming DMA page address to retrieve the translated physical address.

Continuing with the example, a PCIe PHB may attach a PCIe bus to the larger system. The PHB hardware can determine, for a given operation, the partitionable endpoint number(s) (PE#(s)) to which the operation belongs. The PHB can also keep track of the state of the PE#, for purposes of stopping the PE on an error and preventing further operations after the error. The PHB can do this on a per PE# basis. The current set up is relatively static, as a number of PEs that have been allocated and the number of entries allocated to each PE are predetermined. Thus, in order to allocate more memory to a particular adapter, all processing across the entire system may need to be stopped, so the entire system can be reconfigured.

The PHB can perform this function in DMA operations. In DMA operations, the PHB can use a requester identifier (RID) associated with the operation as an index into an RID Translation Table (RTT). In this instance, a PE# field of an RTT entry (RTE) can indicate the PE# associated with the RID, and thus the RID can be used as an index into the RTT to access the RTE.

Embodiments of the present disclosure are directed toward a more flexible address allocation for use in the translation of I/O DMA addresses. For example, a PE# may be obtained from an I/O device PCIe transaction RID (e.g., Bus, Device, and Function numbers), and using an RTT or RTT cache. The PE can then be used to access a particular entry in a translation validation table (TVT). The TVT may be a single, contiguous table organized by PE#. Thus, the PE# is used to locate a particular TVT entry (TVE). Once the TVE is validated, a check of a particular bit (e.g., bit 58) may occur. If bit 58 is "0", then it may indicate that TVT Extended mode is not used for that particular PE# (and thus the adapter associated with the PE#). In that case, the normal mode of operation as in the existing hardware is executed, in order to access the physical address. If, however, the bit (e.g., bit 58) is "1", this can indicate that the TVT extended mode is used, and an "extended mode bit" field is used to access the extended TVT.

FIG. 1 depicts a high level block diagram of a data processing system 100, according to embodiments. The data processing system 100 can be, for example, a symmetric multiprocessor (SMP) system including a plurality of processors 102a-102n, each coupled for communication to a system fabric 104, which may include one or more bused or switched communication links. For example, data processing system 100 may be implemented with an IBM ESERVER. A data processing system with a single processor 102 may also be used.

Consistent with embodiments, each processor 102 may be realized as a single integrated circuit chip having a substrate on which semiconductor circuitry is fabricated. As shown, processor 102 includes a plurality of processor cores 110 that process data through the execution and/or processing of program code, which may include, for example, software and/or firmware and associated data. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116.

Each processor 102 further includes a fabric interface (FIF) 118 by which processor 102 communicates with system fabric 104, as well as one or more host bridges supporting input/output communication with various input/output adapters (IOAs) 130. In the figure as shown, all of the host bridges are implemented as Peripheral Component Interconnect (PCI) host bridges (PHBs) 120, but in other embodiments the host bridges may implement one or more additional or alternative I/O bus standards.

PHBs 120a, 120k, 120m, and 120v provide interfaces to PCI local busses 122a, 122k, 122m, and 122v, respectively, to which IOAs 130, such as network adapters, storage device controllers, peripheral adapters, etc., may be directly connected or indirectly coupled. For example, PCI IOA 130a is coupled to PCI local bus 122a optionally through an I/O fabric 124a, which may comprise one or more switches and/or bridges. In a similar manner, PCI IOAs 130k and 130l are coupled to PCI local bus 122k optionally through an I/O fabric 124k, PCI IOA 130m is coupled to PCI local bus 122m optionally through I/O fabric 124m, and PCI IOAs 130v and 130w, which may comprise, for example, a display adapter and hard disk adapter, are coupled to PCI local bus 122v optionally through I/O fabric 124v.

Data processing system 100 can further include a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM) and non-volatile memory (e.g., non-volatile random access memory (NVRAM) or static random access memory (SRAM))). Service processor 140 is further coupled to a mailbox interface 144 through which service processor 140 communicates I/O operations with PCI bus 122a.

The architecture and components of a data processing system can vary between embodiments. For example, other devices and interconnects may alternatively or additionally be used. Accordingly, the data processing system 100 in FIG. 1 is not meant to imply architectural limitations with respect to the disclosed.

Figure 2:
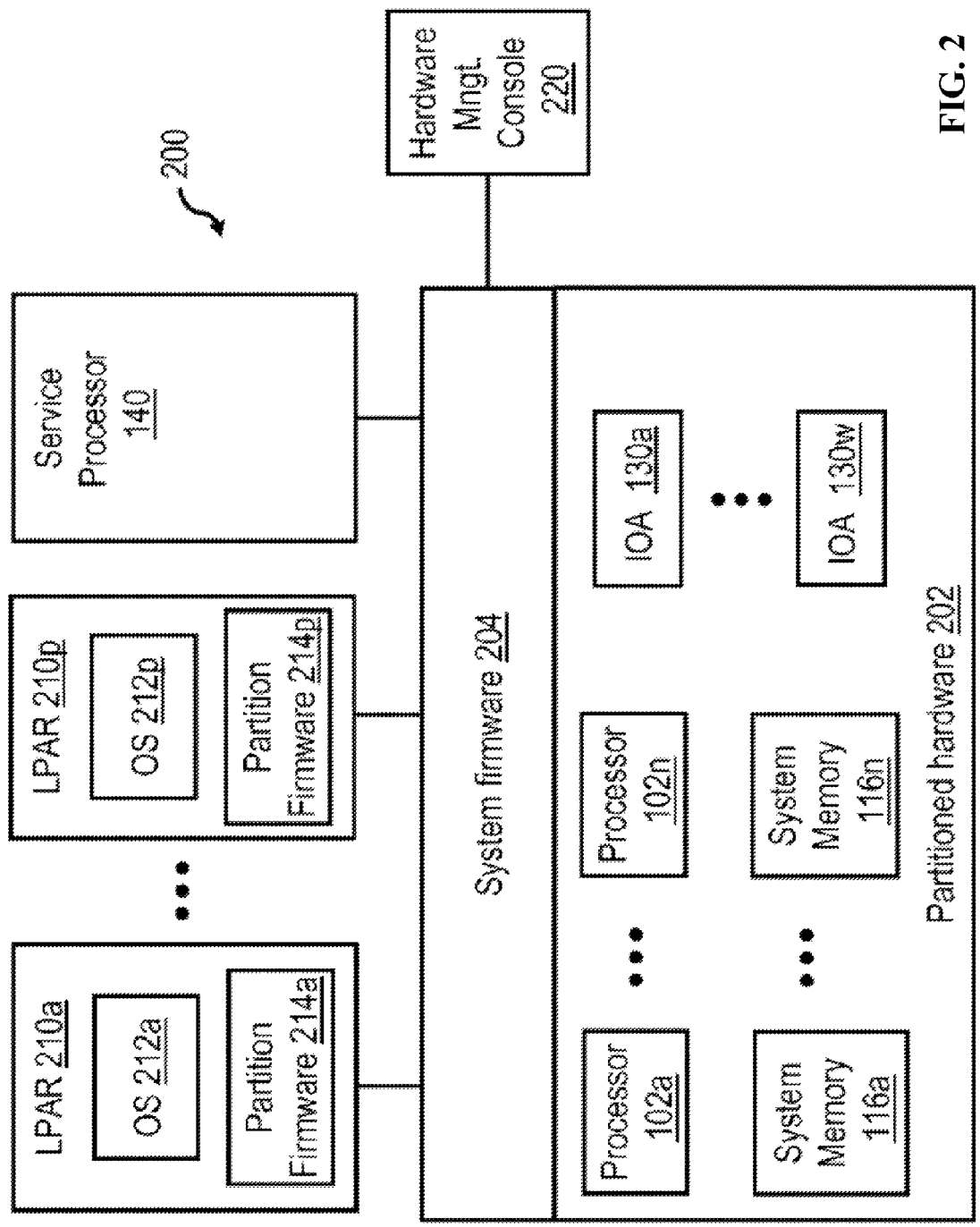
FIG. 2 depicts a logical view of a data processing system showing the hardware and software resources of the data processing system partitioned into multiple logical partitions (LPARs), according to embodiments.

FIG. 2 depicts a logical view of a data processing system 200 showing the hardware and software resources of the data processing system partitioned into multiple logical partitions (LPARs). Data processing system 200 may have, for example, the same components and/or architecture as data processing system 100 in FIG. 1 and may accordingly identify common components with like reference numerals.

Data processing system 200 has a collection of partitioned hardware 202, including processors 102a-102n, system memories 116a-116n and IOAs 130a-130w. Partitioned hardware 202 may of course include additional unillustrated components, such as additional volatile or nonvolatile storage devices, ports, bridges, switches etc. The hardware components comprising partitioned hardware 202 (or portions thereof) can be assigned to various logical partitions (LPARs) 210a-210p in data processing system 200 by system firmware 204, also referred to as a virtual machine monitor (VMM) or hypervisor. System firmware 204 supports the simultaneous execution of multiple independent operating system instances by virtualizing the portioned hardware of data processing system 200.

In addition to the hardware resources allocated by system firmware 204, each of LPARs 210a-210p includes a respective one of multiple concurrently executable operating system instances 212a-212p. In various embodiments, operating system instances 212a-212p, which may include, for example, instances of LINUX, AIX, and/or WINDOWS, may be homogenous or heterogeneous. Each LPAR 210 may further include unillustrated application programs, as well as a respective instance of partition firmware 214. When LPARs 210a-210p are instantiated, boot strap code is loaded onto partitions 210a-210p by system firmware 204. Thereafter system firmware 204 may transfer control to the boot strap code, which can load firmware and software. The processor(s) 102 assigned to each LPAR 210 may then execute the partition firmware 214 of that LPAR to bring up the LPAR and initiate execution of an OS instance 212.

In the logically partitioned environment shown in FIG. 2, service processor 140 can be used to provide various services, such as processing of errors in LPARs 210a-210p. These services may also function as service agents to report errors back to a system administrator or a vendor of data processing system 200. The operation of the different LPARs 210 may further be controlled through a hardware management console 220. Hardware management console 220 can be implemented as a separate data processing system from which a system administrator may perform various functions within data processing system 200 including, but not limited to, creating and destroying LPARs 210, as well as reallocating hardware and software resources among LPARs 210.

Additionally, in a logically partitioned environment as shown, it may not be permissible for the hardware or software resources in one LPAR 210 to consume the resources of or affect the operations in another LPAR 210. Furthermore, to be useful, the assignment of resources to LPARs 210 in certain embodiments needs to be fine-grained. For example, it is often not acceptable to assign all IOAs 130 under a particular PHB 120 (both from FIG. 1) to the same partition, as that may restrict configurability of the system, including the ability to dynamically reallocate resources between partitions. Accordingly, PHBs 120 are able to assign resources, such as individual IOAs 130 (or portions thereof) to different LPARs 210 while preventing the assigned resources from accessing or affecting the resources of other LPARs 210.

To support such isolation between the resources of different LPARs 210, the I/O subsystem of a data processing system can be subdivided into multiple partitionable endpoints. A "partitionable endpoint" or "PE" is defined herein as any component or subcomponent of an I/O subsystem that can be allocated to an LPAR independently of any other component or subcomponent of the I/O subsystem. For example, some PEs may comprise a plurality of IOAs and/or I/O fabric components that function together and, thus, should be allocated as a unit to a single LPAR. Another PE, however, may comprise a portion of a single IOA, for example, a separately configurable and separately assignable port of a multi-port IOA. A PE may be identified by its function rather than its structure.

Figure 3:
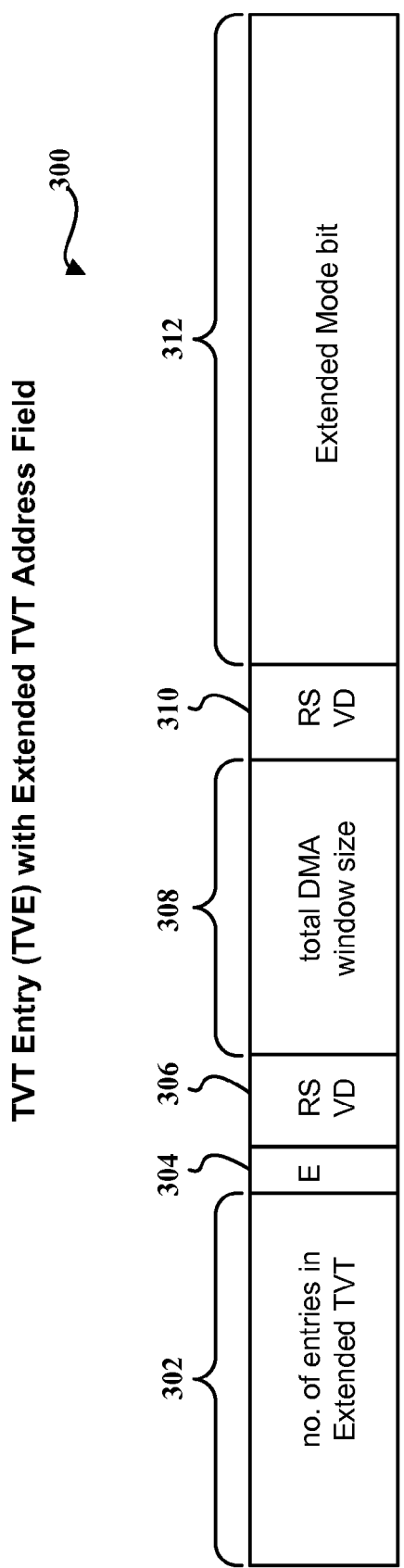
FIG. 3 depicts an example TVT entry within a TVT, according to embodiments.

FIG. 3 depicts an example TVT Entry 300 within a TVT, according to embodiments. The TVT entry (TVE) 300 depicted contains an extended mode bit 312. Unlike a standard TVE, where a similar location within the TVE contains a TCE table address field (further discussion in later figures), the TVE 300 pictured points to an extended TVT, rather than a TCE table. The entry 300 can contain a field that indicates the number of entries in the extended TVT 302. This field can indicate an encoded value of a number of TVT entries in the extended TVT table for the particular PE. Another field labeled "E" 304, can be a one-bit field that indicates whether or not the TVE has an extended mode. For example, a "1" could indicate that the TVE is associated with an extended mode (e.g., points to the extended TVT rather than TCE table), where a "0" could indicate that the TVE is configured to operate in "normal" or "standard" mode (e.g., points to a TCE table not the extended TVT). Herein this one-bit field that can indicate whether or not the TVE has an extended mode can be referred to as an extended mode one-bit.

Fields 306 and 310 labeled "RSVD" are reserved fields and are not relevant to the current disclosure, other than to accurately depict a particular TVE layout. Field 308 labeled "total DMA window size" can, in some embodiments, be a 5-bit field that indicates the encoded value of the total DMA window size configured under the TVE 300. This total DMA window may be equally distributed among all the entries in the extended TVT. The value in this field indicates a particular size of a DMA window. The number of bits allocated to this field (e.g., 5) and the encoding algorithm used may vary and be determined by the particular platform implementation. For example, Table 1 below lists relationships between the value in the field 308 and the size of the DMA window.

TABLE 1

| Value | DMA Window Size |
| --- | --- |
| 0 | Invalid |
| 1 | 2 MB |
| 2 | 4 MB |
| 3 | 8 MB |
| 4 | 16 MB |
| 5 | 32 MB |
| 6 | 64 MB |
| ... | ... |
| 29 | 512 TB |
| 30 | 1 PB |
| 31 | 2 PB |

Field 312 is the extended mode bit, which may contain the physical real address of the extended TVT allocated in memory for the particular entry (and thus PE, as the TVEs in the TVT are organized by PE).

Figure 4A:
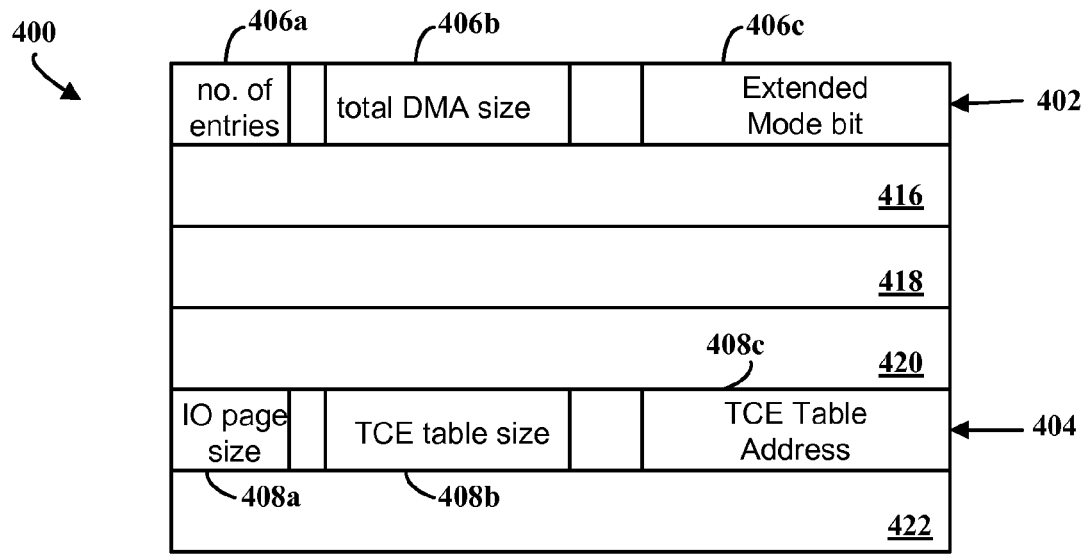
FIG. 4A depicts a translation validation table (TVT), according to embodiments.

FIG. 4A depicts a translation validation table (TVT) 400, according to embodiments. The TVT 400 may be a contiguous table in system memory, and the TVT 400 may be comprised of a number of entries (TVEs). For example, entries 402 and 404 are depicted in FIG. 4A. Entries 416-422 are also depicted, and may represent any number of intervening entries in a TVT. The TVT 400 may be organized by PE#.

TVE 404 depicts a standard TVT entry. As indicated, TVE 404 does not have an address bit field that points to the extended TVT. Rather, it is comprised of, among potentially other fields, an I/O page size field 408a, a TCE table size field 408b, and a TCE table address field 408c. The TCE table address field 408c points to the start of the TCE table associated with the particular PE. A particular address within a TCE table address can be identified, which can then be used to access the physical address associated with the PE associated with the TVE 404.

TVE 402 depicts a modified TVT entry, with an extended mode bit 406c. The TVE 402 may include a number of entries field 406a, a total DMA size field 406b and an extended mode bitfield 406c, the latter of which points to a location in an extended TVT. TVEs depicted here are example TVEs only, and are not intended to limit configuration of TVEs or TVTs.

Figure 4B:
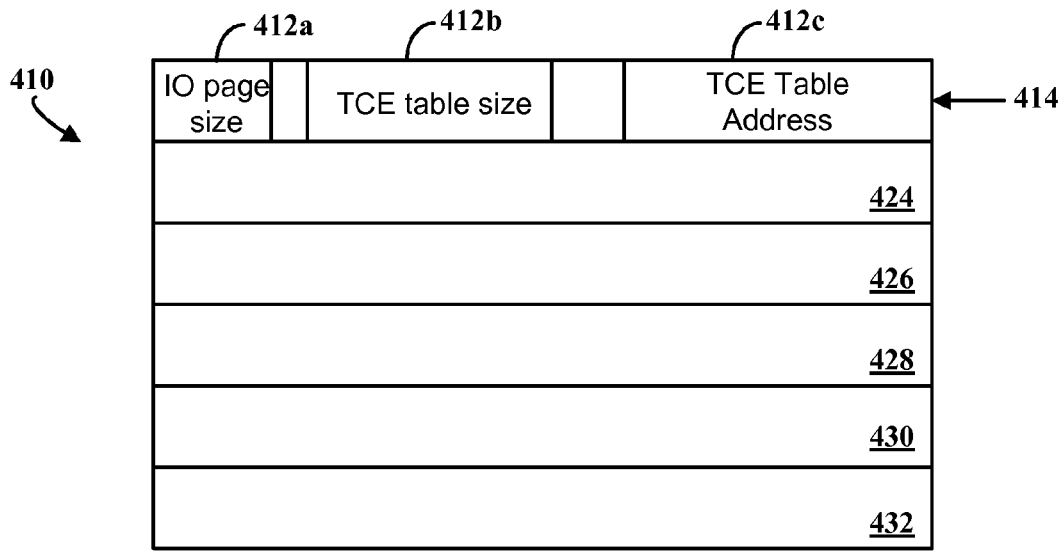
FIG. 4B depicts an extended translation validation table (TVT), according to embodiments.

FIG. 4B depicts an extended translation validation table (TVT) 410, according to embodiments. Extended TVT 410 may comprise extended TVT entries 414 and 424-432. The extended TVT 410 may have more or fewer entries than those depicted. An example extended TVT entry (TVE) 414 depicted may contain an I/O page size field 412a, a TCE table size field 412b, and a TCE table address field 412c. The TCE table address field 412 can point to the start of the TCE table, from which a particular location in the TCE table can be identified, the location of which can be used to complete the translation to a physical system memory address.

Figure 5:
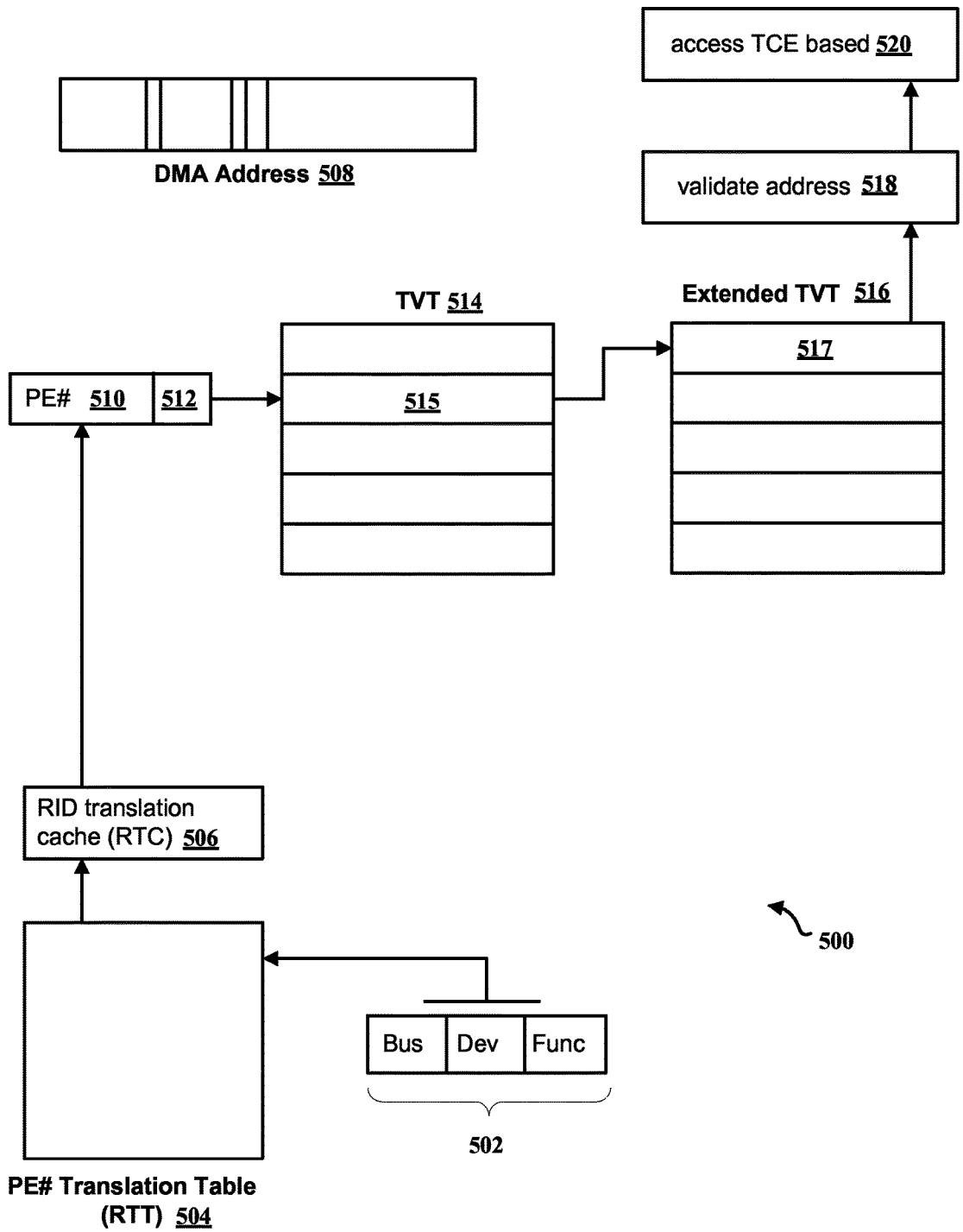
FIG. 5 depicts a system flow diagram for translating a DMA address, according to embodiments.

FIG. 5 depicts a system flow diagram 500 for translating a DMA address. The system flow 500 may begin when a PHB receives a PCIE transaction RID 502 from an I/O device. The RID 502 may comprise bus, device, and function numbers. Using the PCIE transaction RID 502 and a PE# Translation Table (also known as a RID translation table (RTT)) 504, a PE# may be obtained. In some circumstances, a lookup in the RTT 504 may not be required, if the required data is stored in a local cache, for example an RID translation cache (RTC) 506. If a lookup is required, the data obtained from the lookup in the RTT 504 may be stored in the RTC 506, as indicated by an arrow between the two. The PE# 510 obtained from either the RTT 504 lookup or accessed from the cache 506, as well as a particular address bit 512 obtained from a DMA address 508 can be used to retrieve the corresponding TVT entry (TVE) 515 from the TVT 514. Data from the particular TVE 515 can be used, in conjunction with another particular bit or bits from the DMA Address 508 to retrieve a corresponding entry 517 in the extended TVT 516. In this way, additional storage (e.g., entries) can be allocated to a particular PE#. Data from the extended TVT entry 517 can be used, along with additional data from the DMA address 508 to validate the address, per 518 and access the TCE based address, per 520. From there, the physical address can be accessed from system memory in one of a number of ways.

Figure 6:
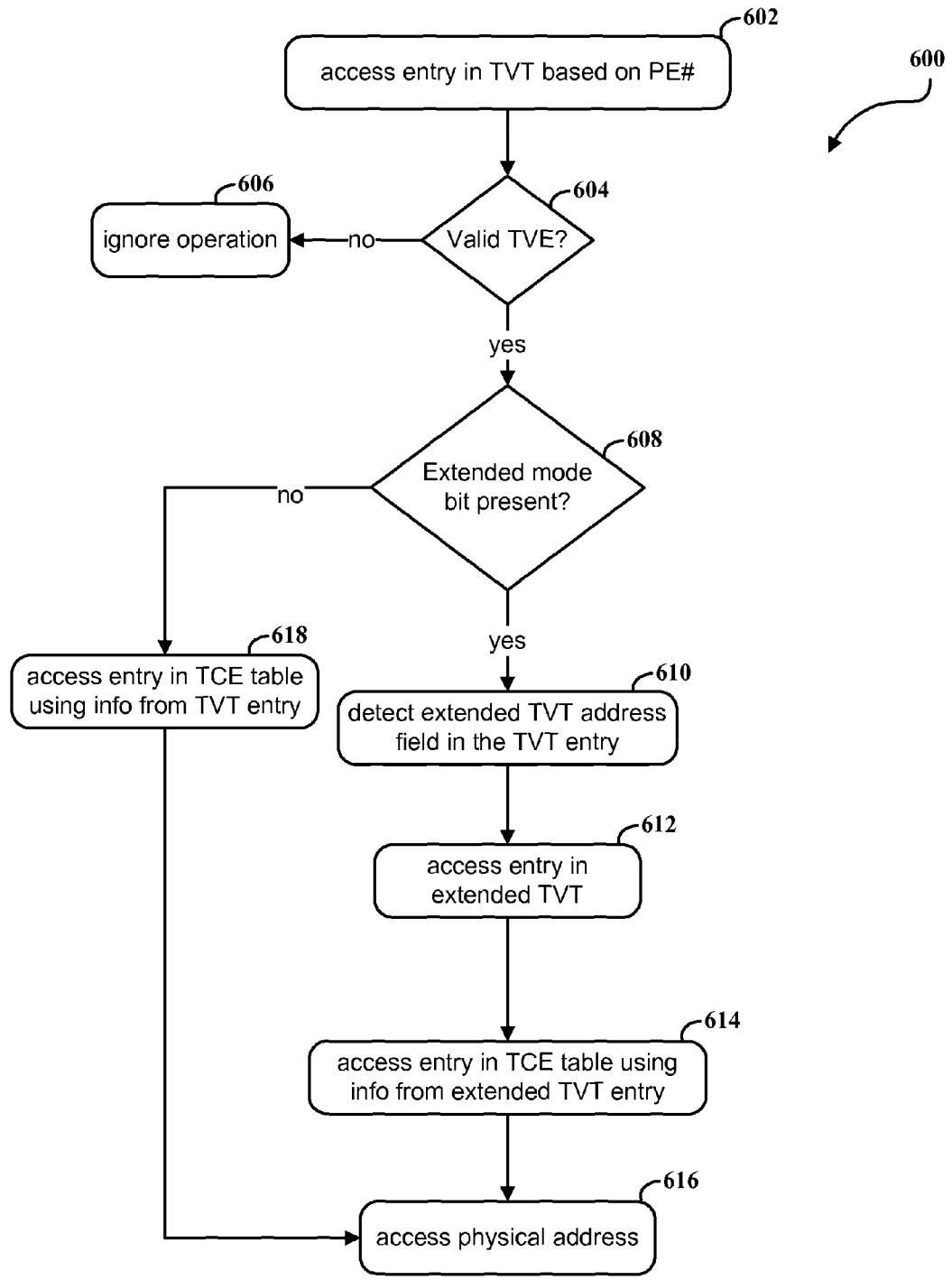
FIG. 6 depicts a flow diagram for translating a DMA address, according to embodiments.

FIG. 6 depicts a flow diagram 600 for translating a DMA address, according to embodiments. The flow diagram 600 can begin when a system attempts to access an entry in a TVT (i.e., a TVE) based on a PE#, per 602. If the TVE is valid, per 604, a check for an extended mode bit in the TVE is conducted, per 608. If at 604, the TVE is not valid, then the operation may be ignored, per 606. At 608, if an extended mode bit is present in the particular TVE, then the system can detect an extended mode bit in the TVT entry, per 610. Using the data in the extended mode bit of the TVE, an entry in the extended TVT may be accessed, per 612. Using the data from the extended TVT entry and from the DMA address, the corresponding entry in the TCE table may be accessed, per 614. The physical address can be accessed using this data, per 616.

If at 608, there is no extended mode bit present, then the address can be translated via standard processes which can include, for example, accessing the corresponding entry in the TCE table using data from the TVT entry, per 618, and accessing the physical address in system memory using data from the accessed entry in the TCE table, per 616.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for translating an input/output (I/O) direct memory address (DMA), wherein a number of entries in a translation validation table (TVT) for a partitionable endpoint number (PE#) is flexible, the system comprising:
   one or more processor circuits configured to:
      access, based on the PE#, a particular entry in the TVT, the PE# determined by a DMA requester ID (RID), and wherein the particular entry in the TVT comprises:
         a number of entries in the extended TVT table field;
         an extended mode bit;
         a total DMA window size field; and
         an extended TVT table address field;
      detect, based on one or more bits in the particular entry in the TVT, a presence of an extended mode bit in the particular entry in the TVT;
      access, from an extended TVT and based on a value in the extended mode bit, an entry in the extended TVT; and
   translate, based on a value from the entry in the extended TVT and from bits in the I/O DMA address, the I/O DMA address to a physical address, the physical address requested by an I/O device associated with the I/O DMA address.

2. The system of claim 1, wherein the PE# is obtained from a RID translation table (RTT), based on data received from an I/O device, the I/O device associated with the I/O DMA address.

3. The system of claim 1, wherein the one or more bits in the particular entry in the TVT comprise an extended mode one-bit, wherein a 1 indicates extended mode and a 0 indicates normal mode.

4. The system of claim 1, wherein the PE# is obtained from a local cache, the local cache storing data retrieved from a RID translation table (RTT).

5. The system of claim 1, wherein the circuit is further configured to translate, based on the value from the entry in the extended TVT by:
   accessing a corresponding entry in a translation control entry (TCE) table, the corresponding entry in the TCE table comprising a real page number (RPN); and
   retrieving, from system memory and based on the RPN, a physical address for the I/O DMA address.

6. The system of claim 1, wherein the entry in the extended TVT comprises:
   an I/O page size field;
   a translation control entry (TCE) table size field;
   a TCE table levels field; and
   a TCE table address field.

7. A computer program product for translating an input/output (I/O) direct memory access (DMA) address, wherein a number of entries in a translation validation table (TVT) for a partitionable endpoint number (PE#) is flexible, the computer program product comprising a computer readable storage medium having program instructions embodied therewith, wherein the computer readable storage medium is not a transitory signal per se, the program instructions executable by a computer processing circuit to cause the circuit to perform the method comprising:

accessing, based on the PE#, a particular entry in the TVT, the PE# determined by a DMA requester ID (RID), and wherein the particular entry in the TVT comprises:
  a number of entries in the extended TVT table field;
  an extended mode bit;
  a total DMA window size field; and
  an extended TVT table address field;
detecting, based on one or more bits in the particular entry in the TVT, a presence of an extended mode bit in the particular entry in the TVT;
accessing, from an extended TVT and based on a value in the extended mode bit, an entry in the extended TVT; and
translating, based on a value from the entry in the extended TVT and from bits in the I/O DMA address, the I/O DMA address to a physical address, the physical address requested by an I/O device associated with the I/O DMA address.

8. The computer program product of claim 7, wherein the PE# is obtained from a RID translation table (RTT), based on data received from an I/O device, the I/O device associated with the I/O DMA address.

9. The computer program product of claim 7, wherein the one or more bits in the particular entry in the TVT comprise an extended mode one-bit, wherein a 1 indicates extended mode and a 0 indicates normal mode.

10. The computer program product of claim 7, wherein the PE# is obtained from a local cache, the local cache storing data retrieved from a RID translation table (RTT).

11. The computer program product of claim 7, wherein the translating, based on the value from the entry in the extended TVT comprises:
  accessing a corresponding entry in a translation control entry (TCE) table, the corresponding entry in the TCE table comprising a real page number (RPN); and
  retrieving, from system memory and based on the RPN, a physical address for the I/O DMA address.

* * * * *